June 22, 1965     A. VAN DER LELY     3,190,368
MOLDBOARD PLOWS
Filed May 19, 1961     3 Sheets-Sheet 1
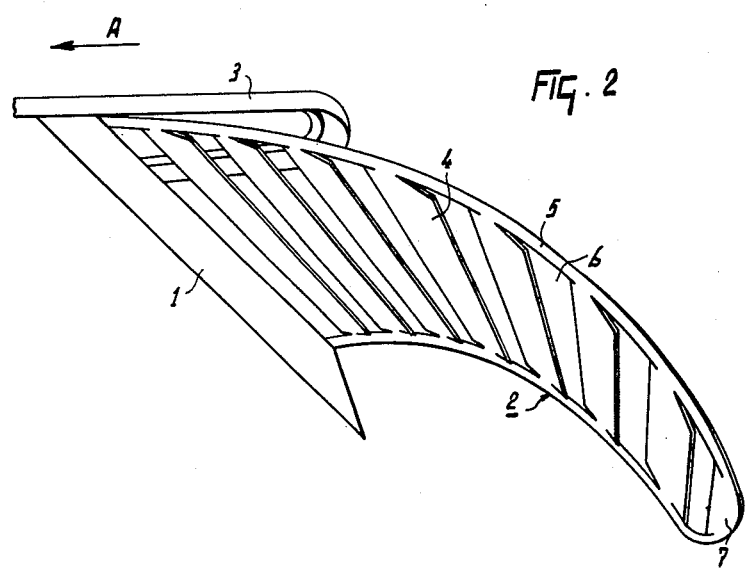
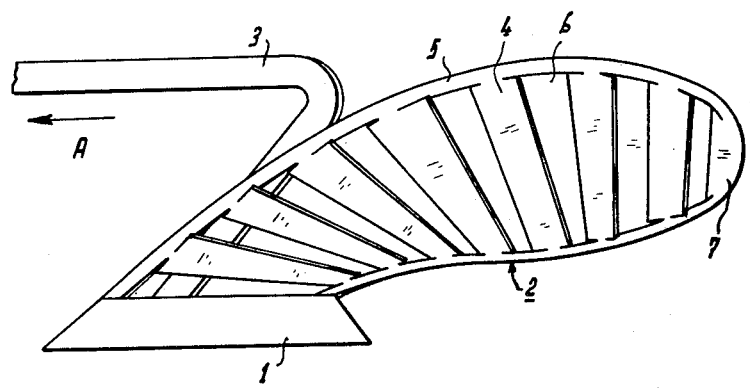
INVENTOR.
ARY VAN DER LELY
BY
Mason, Mason & Albright
ATTORNEYS

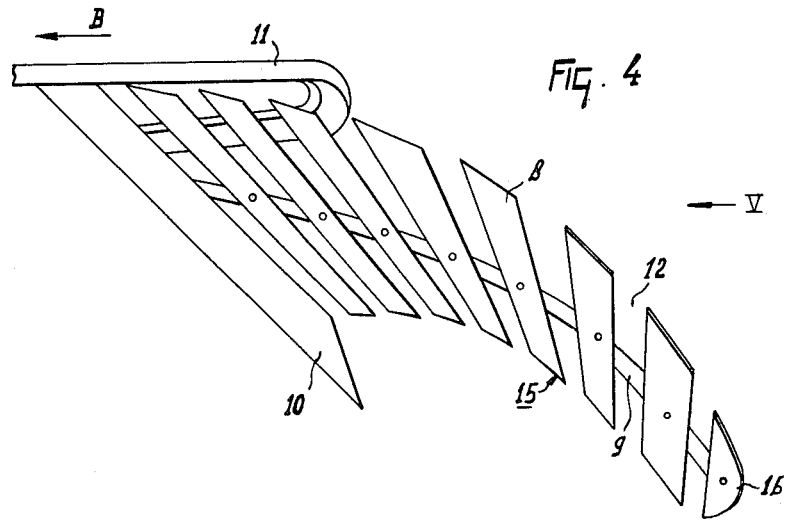
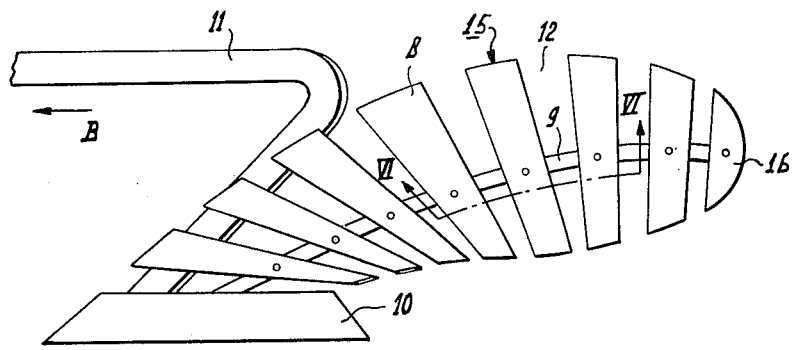

June 22, 1965  A. VAN DER LELY  3,190,368
MOLDBOARD PLOWS
Filed May 19, 1961  3 Sheets-Sheet 3
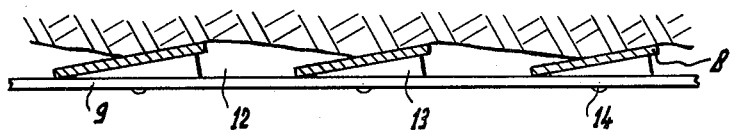
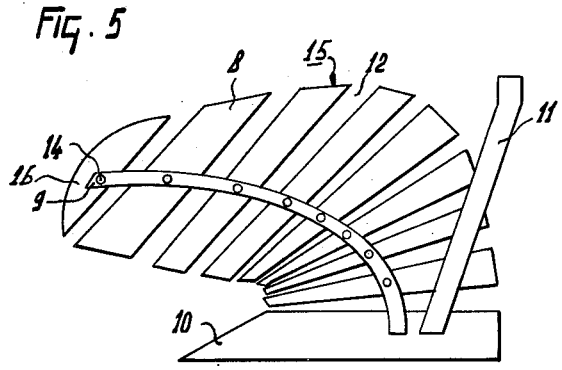
INVENTOR.
ARY VAN DER LELY 3,190,368
MOLDBOARD PLOWS
Ary van der Lely, Maasland, Netherlands, assignor to C. van der Lely N.V., Maasland, Netherlands, a limited-liability company of the Netherlands
Filed May 19, 1961, Ser. No. 111,357
Claims priority, application Netherlands, June 10, 1960, 252,529
6 Claims. (Cl. 172—756)

This invention relates to a moldboard plow.

It is known that moldboard plows generally include a share and a deflector arranged so that the share may be dragged through the earth in order to cut from the earth a furrow slice which passes onto and over the deflector. The deflector surface is curved so that, as the furrow slice moves over the same, the furrow slice is turned and is deflected laterally with respect to the direction of movement of the plow, before being deposited from the end of the deflector. The deflectors of known plows are often formed by suitably curved plates or boards, known as "moldboards." A unit consisting of a share and a deflector surface is termed a "plow body," and plows in general use may be provided with one, two, or three plow bodies.

According to the present invention, there is provided a deflector for a moldboard plow, the deflector being formed by an array of strips or the like disposed one behind the other with reference to the intended direction of movement of soil over the deflector surface generally defined by such array, each strip being inclined to said direction.

For a better understanding of the invention and to show how the same may be carried into effect, reference will now be made by way of example to the accompanying drawings, in which:

FIGURE 1 is a side elevation of a plow body including a first embodiment of a deflector, FIGURE 2 is a plan of the plow body shown in FIGURE 1, FIGURE 3 is a side elevation of a plow body including a second embodiment of a deflector, FIGURE 4 is a plan of the plow body shown in FIGURE 3, FIGURE 5 is a rear view of the plow body shown in FIGURE 3, as seen in the direction of the arrow V, and FIGURE 6 is a section taken on the line VI—VI in FIGURE 3.

The plow body shown in FIGURES 1 and 2 comprises a share 1 and a deflector 2, and is secured to a plow 3. The deflector 2 is formed from an array of vane like elements constituting strips 4 which are equidistantly spaced one behind the other with gaps 6 therebetween, and which are inclined to the deflector surface generally defined by the array of strips. The strips 4 are formed from a plate 5 which constitutes the deflector 2 by cutting and bending the plate, so that the strips 4 are integral with the edge of the plate and the gaps 6 are produced.

It will be seen from FIGURES 1 and 2 that each strip 4 is, in effect, twisted with respect to the edge of the plate 5.

During operation, the plow body is moved in the direction indicated by the arrow A. A furrow slice is cut from the soil by the share 1 and moves from the share over the deflector 2 towards the end 7 thereof, where the soil leaves the deflector. It may be seen from FIGURES 1 and 2 that the strips 4 are located one behind the other with reference to the direction in which the soil moves over the moldboard, and that the longer sides of the strips extend transversely to such direction of movement. The longer sides of the strips 4 may be inclined to the direction of movement of the soil at angles between 45° and 90°, preferably between 75° and 90°. It may be seen also from FIGURES 1 and 2, that, on the side of the deflector 2 which is in contact with the soil, the strips 4 are inclined so that those parts of each strip encountered last by the soil moving over the deflector, are disposed further from the deflector surface generally defined by the array of strips, than are the other soil-engaging parts of the strips. The surface of the deflector may extend substantially helically, or may form part of a cylindrical surface, so that the deflector has the same general form as a conventional moldboard.

The plow board shown in FIGURES 3 to 6 comprises a share 10 and a deflector 15, and is secured to a plow beam 11. The deflector 15 is formed from an array of flat strips 8 which are secured near their centers to a supporting member 9. The supporting member 9 is fixed at one end to the plow share 10, to which is also fixed the beam 11. The strips 8 are secured to the supporting member so that their longer sides extend transversely to the member, and so that they are equidistantly spaced one behind the other, gaps 12 being left therebetween. The strips 8 are secured to the supporting member 9 through the intermediary of wedge-shaped supports 13 by rivets 14. By virtue of the arrangement of the wedge-shaped supports, the strips 8 are inclined to the deflector surface generally defined by the array of strips. The lengths of the strips 8 and the shapes of their ends are such that the envelope of their ends is smooth, and has substantially the same shape as the edge of a conventional moldboard. To assist in forming this shape, the endmost strip is rounded off on its side 16, remote from the other strips to produce the curved end of the moldboard.

During operation, the plow body is moved in the direction indicated by the arrow B. A furrow slice is cut from the soil by the share 10 and moves from the share over the deflector 15 towards the end 16 thereof, where it leaves the deflector. The supporting member 9 is arranged to extend substantially in the direction in which the soil moves over the deflector in operation. As in the previously described embodiment, it is apparent from the drawings that the strips 8 are located one behind the other with reference to the direction in which the soil moves over the deflector, and that the longer sides of the strips are transverse to such direction of movement. The longer sides of the strips may be inclined to the direction of movement of the soil at angles between 45° and 90°, preferably between 75° and 90°. It may be seen from FIGURE 6 that the strips 8 project from the deflector surface generally defined by the array of strips, and are disposed so that those parts of each strip encountered last by the soil moving over the deflector, are disposed further from such deflector surface than are the other soil-engaging parts of the strips.

The operation of the above-described deflectors will now be more fully described:

The furrow slice cut by the plowshare is pushed on to the deflector as the plow is drawn over the ground, and the soil moves over the deflector. Since the strips from which the deflector is formed lie one behind the other with reference to the direction of movement of the soil, and are inclined in the manner described to the surface generally defined by the array of strips, the soil will not pass through the gaps between the strips as it passes over the deflector, but it will move from one strip to the next succeeding strip (see FIGURE 6). Thus there is the advantage that the total surface of contact between the deflector and the soil is less than with conventional moldboards of equivalent size, so that the frictional force produced is less, whereby the soil moves more readily over the deflector and the force required for drawing the plow is reduced.

A further advantage of the above-described constructions is that the deflector, in operation, produces better crushing of the soil than does a conventional, plate-like, moldboard. This is especially advantageous when plowing land to be seeded, since the time required for aftertreatment of the soil (e.g. harrowing) can be reduced.

What I claim is:

1. A moldboard for a plow having a plowshare, said moldboard having an edge portion attached to the plowshare and an array of vanes secured to said edge portion, said vanes having leading and trailing edges, the ends of said vanes being secured to said edge portion intermediate their leading and trailing edges, said vanes being connected to said edge portion with their leading edges away from and their trailing edges into the soil with reference to the normal movement of soil over said moldboard.

2. The invention of claim 1 wherein the moldboard is formed from plate, said vanes and edge portion constituting integral portions thereof.

3. The invention of claim 1 wherein the vanes are equidistantly spaced.

4. A moldboard for a plow having a plowshare which comprises a connection member attached to the plowshare and extending rearwardly generally parallel to the direction of travel, and an array of vanes connected thereto in spaced relationship with each other near their centers, said vanes defining a soil deflecting surface and being disposed transversally to the normal movement of soil over the moldboard, said vanes having leading and trailing edges with the leading edges in toward the connection member and the trailing edges out whereby the soil is prevented from passing through the spaces between said vanes.

5. The invention of claim 4 wherein the connection member is arranged on that side of the moldboard remote from the soil which normally moves over said moldboard.

6. The invention of claim 4 wherein the vanes are secured to the connection member through the intermediary of wedges.

References Cited by the Examiner

UNITED STATES PATENTS

| 118,551 | 8/71 | Peacock | 172—760 |
| 135,307 | 1/73 | Barrows | 171—106 |
| 208,008 | 9/78 | Allen | 171—106 X |
| 412,110 | 10/89 | Lynch | 172—756 X |
| 424,945 | 4/90 | Allen | 171—106 X |
| 568,216 | 9/96 | Smith | 172—756 |
| 1,027,044 | 5/12 | Gubrud | 172—756 |

T. GRAHAM CRAVER, *Primary Examiner.*

A. JOSEPH GOLDBERG, *Examiner.*